(12) United States Patent
Rosen

(10) Patent No.: US 7,956,573 B1
(45) Date of Patent: Jun. 7, 2011

(54) BATTERY CHARGING SYSTEM WITH DISCHARGING MEANS

(76) Inventor: Greg Rosen, Plantation, FL (US)

( * ) Notice: Subject to any disclaimer, the term of this patent is extended or adjusted under 35 U.S.C. 154(b) by 306 days.

(21) Appl. No.: 12/248,253

(22) Filed: Oct. 9, 2008

(51) Int. Cl.
*H02J 7/00* (2006.01)
*H02J 7/02* (2006.01)

(52) U.S. Cl. ........ 320/110; 320/107; 320/111; 320/112; 320/113

(58) Field of Classification Search .................. 320/110, 320/112, 107
See application file for complete search history.

(56) References Cited

U.S. PATENT DOCUMENTS

| | | | |
|---|---|---|---|
| 3,579,075 A | 5/1971 | Floyd | |
| 4,816,735 A | 3/1989 | Cook et al. | |
| 5,543,702 A | 8/1996 | Pfeiffer | |
| 5,686,811 A | 11/1997 | Bushong et al. | |
| 6,018,227 A * | 1/2000 | Kumar et al. | 320/106 |
| 6,204,632 B1 * | 3/2001 | Nierescher et al. | 320/116 |
| 6,765,306 B2 * | 7/2004 | Fattic | 290/40 C |
| D512,019 S | 11/2005 | Lie | |
| 2003/0178968 A1 * | 9/2003 | Sakakibara et al. | 320/110 |
| 2007/0247105 A1 | 10/2007 | Krieger et al. | |

* cited by examiner

*Primary Examiner* — Edward Tso
*Assistant Examiner* — Ahmed Omar
(74) *Attorney, Agent, or Firm* — Kyle Fletcher

(57) ABSTRACT

The invention is a battery charging system with discharging means that includes a housing containing a plurality of charging units. The charging units come in a variety of sizes as well as in multiples of each size. The invention also includes a plurality of discharging units, which are capable of draining out any remaining charge left in the battery prior to the recharging process.

5 Claims, 4 Drawing Sheets

BATTERY CHARGING SYSTEM WITH DISCHARGING MEANS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of battery chargers, more specifically, a battery charger that accommodates a plurality of battery sizes as well as a plurality of each size while including a discharging unit, and charging status indicating means.

Battery chargers have been around for a long time, and serve a useful function in recharging a battery that would otherwise become trash and a burden on the environment. However, a rechargeable battery has a useful lifespan that is limited to a finite number of times that said battery can be recharged. It is well known that the overall lifespan of a battery can be affected by recharging a battery without being fully drained of a charge.

The present invention seeks to overcome this disadvantage enable the battery to be fully consumed prior to recharging in an effort to improve the overall useful lifespan of said battery.

B. Discussion of the Prior Art

As a preliminary note, it should be stated that there is an ample amount of prior art that deals with battery chargers. As will be discussed immediately below, no prior art discloses a battery charger that includes a discharging unit.

The Pfeiffer Patent (U.S. Pat. No. 5,543,702) discloses a battery charger for charging dry cell batteries in a device that can hold multiple batteries of different sizes and of different electrical needs. However, the battery charger does not include a discharging unit that removes any remaining electrical charge remaining in the battery prior to re-charging said battery in order to improve the overall life of said battery.

The Bushong et al. Patent (U.S. Pat. No. 5,686,811) discloses a compact battery charger that holds different size batteries and multiples of each. Again, the battery charger does not include the discharging unit mentioned above, which is a unique feature of the invention of the present application.

The Floyd Patent (U.S. Pat. No. 3,579,075) discloses a device that holds and charges alkaline batteries of different sizes and electrical capabilities. However, the device does not have a plurality of different-sized charging units to accommodate batteries of differing sizes, but rather a one-size fits all charging unit.

The Cook et al. Patent (U.S. Pat. No. 4,816,735) discloses a battery charger that can adjust to different sizes. Again, the battery charger does not have a plurality of different-sized charging units to accommodate batteries of differing sizes, but rather a one-size fits all charging unit.

The Krieger Patent Application Publication (U.S. Pub. No. 2007/0247105) discloses a portable battery charger for charging batteries of multiple sizes and power outputs. However, the battery charger has only a single slot for each battery slot as opposed to multiple charging units for multiple battery sizes.

While the above-described devices fulfill their respective and particular objects and requirements, they do not describe a battery charging system with discharging means that provides for the advantages of the battery charging system with discharging means. In this regard, the battery charging system with discharging means departs from the conventional concepts and designs of the prior art.

SUMMARY OF THE INVENTION

The invention is a battery charging system with discharging means that includes a housing containing a plurality of charging units. The charging units come in a variety of sizes as well as in multiples of each size. The invention also includes a plurality of discharging units, which are capable of draining out any remaining charge left in the battery prior to the recharging process.

It is an object of the invention to provide a battery charging system with discharging means that will further the overall lifespan of a battery.

A further object of the invention is to provide a battery charging system that includes a plurality of charging units of differing sizes.

A further object of the invention is to provide a battery charging system that includes a plurality of charging units for a single battery size.

These together with additional objects, features and advantages of the provide a battery charging system with discharging means will be readily apparent to those of ordinary skill in the art upon reading the following detailed description of presently preferred, but nonetheless illustrative, embodiments of the provide a battery charging system with discharging means when taken in conjunction with the accompanying drawings.

In this respect, before explaining the current embodiments of the battery charging system with discharging means in detail, it is to be understood that the battery charging system with discharging means is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the battery charging system with discharging means. It is therefore important that the claims be regarded as including such equivalent construction insofar as they do not depart from the spirit and scope of the battery charging system with discharging means. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
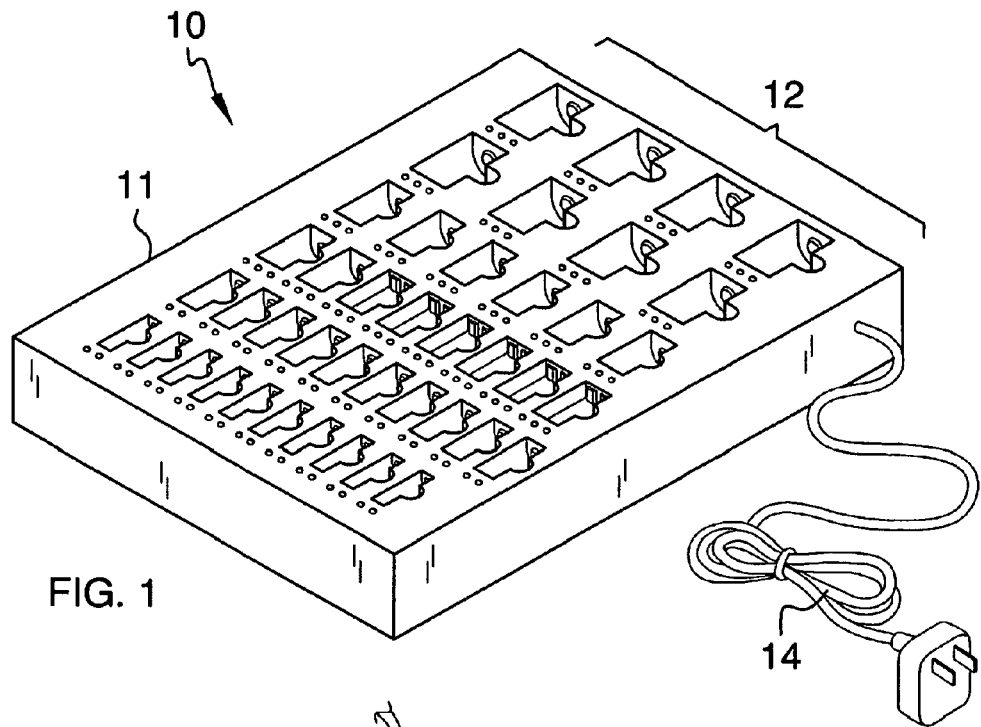
FIG. 1 illustrates a top, isometric view of the invention.
Figure 2:
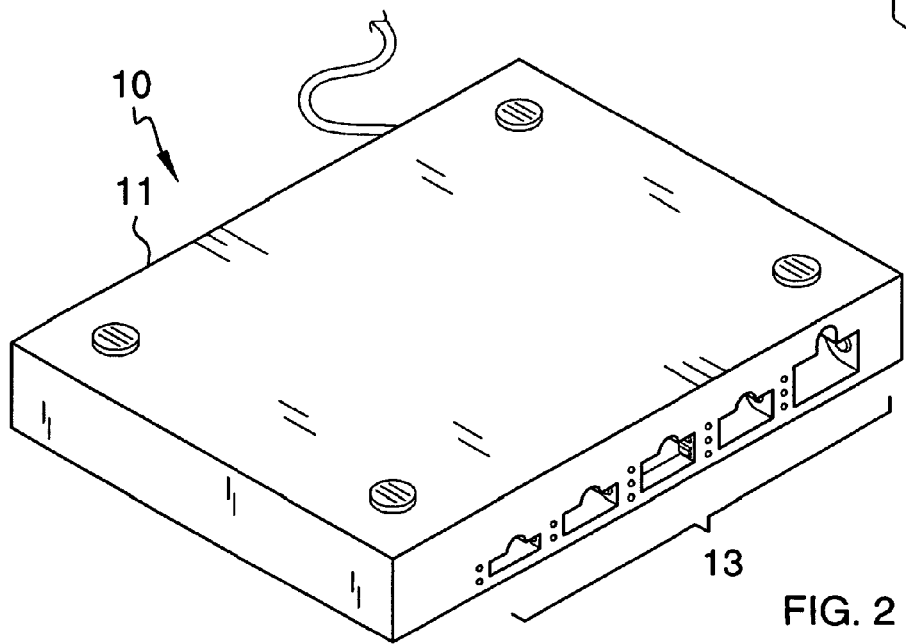
FIG. 2 illustrates a bottom, isometric view of the invention by itself.
Figure 3:
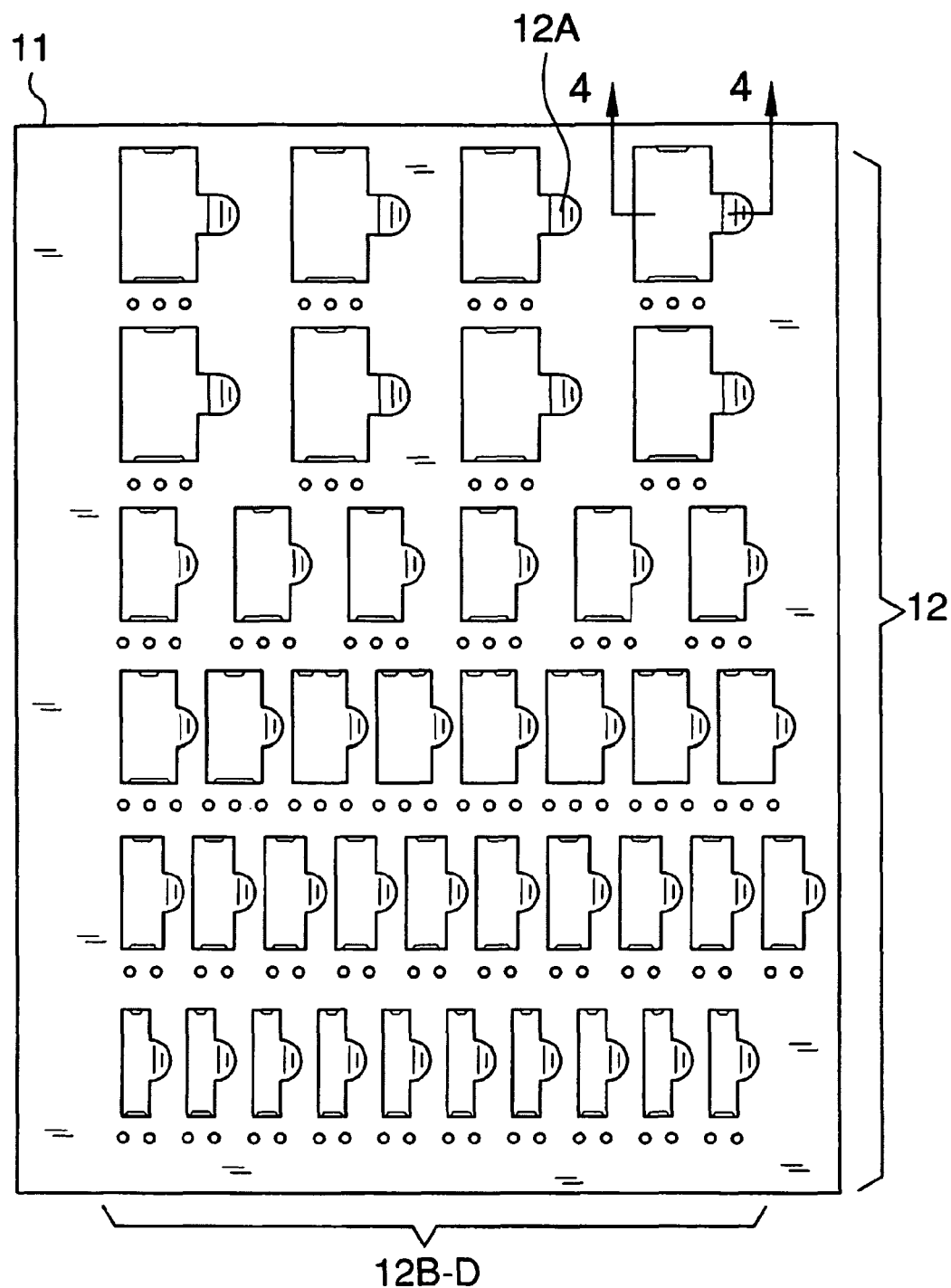
FIG. 3 illustrates a top view of the invention by itself.
Figure 4:
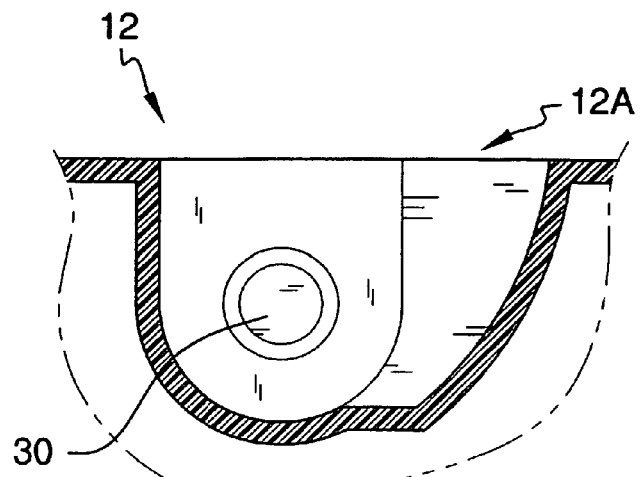
FIG. 4 illustrates a cross-sectional view of a charging unit along line 4-4 in FIG. 3.
Figure 5:
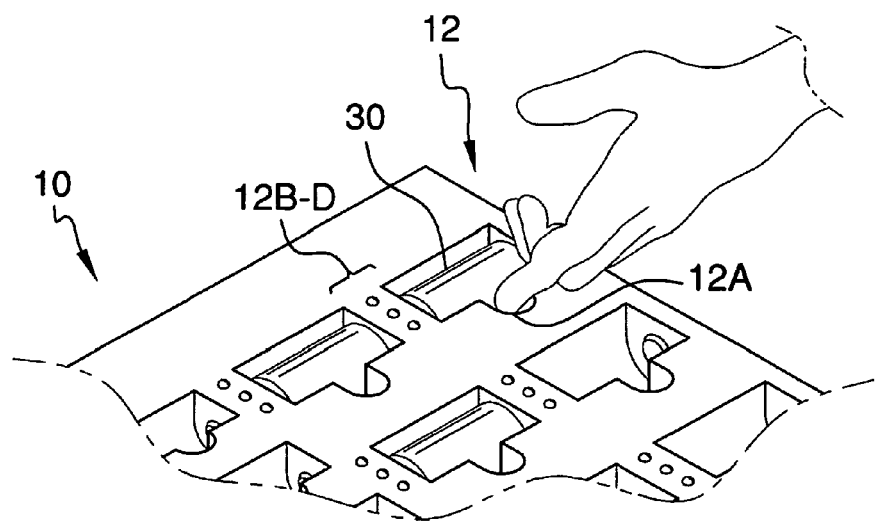
FIG. 5 illustrates a view of how a battery is removed from the charging unit.

Detailed reference will now be made to the preferred embodiment of the present invention, examples of which are illustrated in FIGS. 1-6. A battery charging system with discharging means 10 (hereinafter invention) includes a housing 11, a plurality of recharging units 12, a plurality of discharging units 13, an electrical cord 14, a power converter 15, and a central processing unit 16 (hereinafter CPU).

The recharging units 12 come in a plurality of battery sizes as well as a plurality for each battery size. The recharging units 12 include a finger slot 12A, which enables a battery 30 to be removed. Located within each recharging unit 12 is a positive terminal (not shown) as well as a negative terminal (not shown), which are wired to the CPU 16.

Figure 6:
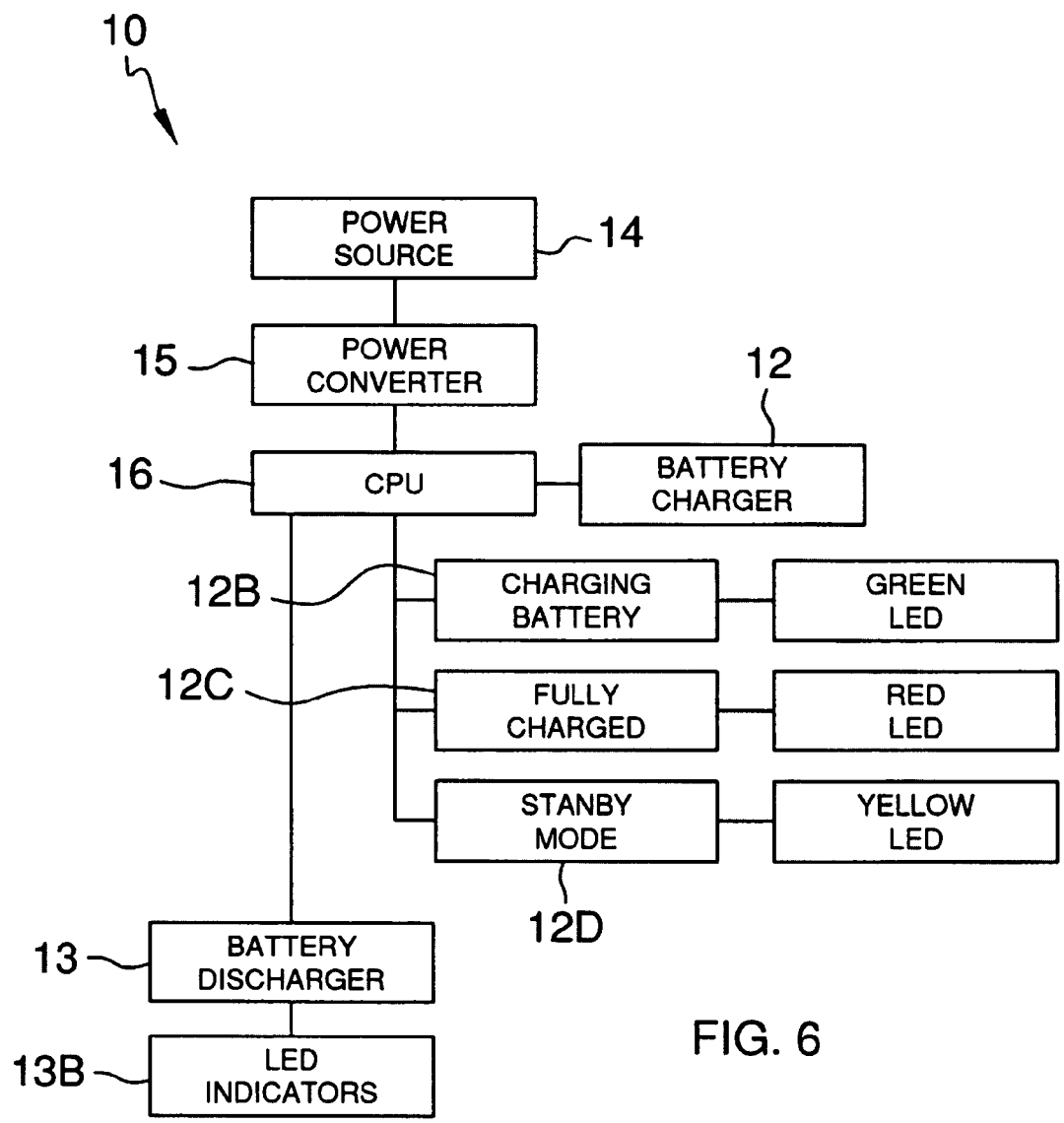
FIG. 6 illustrates a diagram of the various electrical components of the invention.

The recharging units 12 each have a charging battery indicator 12B, a fully charged indicator 12C, and a standby mode indicator 12D. Referring to FIG. 6, the indicators 12B-D are each assigned a colored light emitting diode. However, it shall be noted that the indicators 12B-D may be of differing colors and/or sounds. Each of the indicators 12B-D is individually wired to the CPU 16.

The battery discharging units 13 come in a plurality of battery sizes. The battery discharging units 13 include a finger slot 13A, which enables the battery 30 to be removed. Located within each battery discharging unit 13 is a positive terminal (not shown) as well as a negative terminal (not shown), which are wired to the CPU 16.

The battery discharging units 13 each have a plurality of discharging battery indicators 13B, which provide an indication that the battery located in the battery discharging unit 13 has a charge remaining.

The power converter 15 is designed to transform electrical power from the electrical cord 14 and/or the discharging units 13 into the appropriate volts and amps assigned for each type of battery. As such, the CPU 16 is merely enabling said electrical power to cross over to the respective recharging units 12.

It shall be noted that the invention 10 may be powered by alternative powering means aside from or in addition to the electrical cord 14, and comprise a single or plurality of batteries (not shown), or a plurality of solar cells (not shown).

It shall also be noted that the battery sizes comprise AAAA, AAA, AA, C, or D.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A battery charging system with discharging means comprising:
    (a) a plurality of recharging units;
        wherein the recharging units include a slot for inserting a rechargeable battery;
        wherein each recharging unit has a plurality of charging status indicators;
        wherein the recharging units come in a plurality of battery sizes;
        wherein the recharging units include a plurality of each battery size;
    (b) a plurality of discharging units;
        wherein the discharging units are designed to drain out any remaining charge left in a battery prior to the recharging of said battery;
        wherein the discharging units can transmit the remaining charge of a rechargeable battery back to the power converter in order to improve the overall efficiency of the battery charging system with discharging means;
    (c) a powering means;
        wherein the powering means is connected to a power converter, which in turn distributes power to the plurality of recharging units.

2. The battery charging system with discharging means as described in claim 1 wherein the status indicators comprise a charging battery indicator, a fully charged indicator, or a standby indicator.

3. The battery charging system with discharging means as described in claim 1 wherein the powering means comprises an electrical cord that plugs into a standard wall outlet, a plurality of solar cells, or a battery.

4. A battery charging system with discharging means comprising:
    (a) a plurality of recharging units;
        wherein the recharging units include a slot for inserting a rechargeable battery;
        wherein each recharging unit has a plurality of charging status indicators;
        wherein the status indicators comprise a charging battery indicator, a fully charged indicator, or a standby indicator;
        wherein the recharging units come in a plurality of battery sizes;
        wherein the recharging units include a plurality of each battery size;
    (b) a plurality of discharging units;
        wherein the discharging units are designed to drain out any remaining charge left in a battery prior to the recharging of said battery;
        wherein the discharging units can transmit the remaining charge of a rechargeable battery back to the power converter in order to improve the overall efficiency of the battery charging system with discharging means;
    (c) a powering means;
        wherein the powering means is connected to a power converter, which in turn distributes power to the plurality of recharging units.

5. The battery charging system with discharging means as described in claim 4 wherein the powering means comprises an electrical cord that plugs into a standard wall outlet, a plurality of solar cells, or a battery.

* * * * *